United States Patent [19]

Kouno

[11] Patent Number: 4,676,121

[45] Date of Patent: Jun. 30, 1987

[54] DEVICE FOR VARYING AN EQUIVALENT INERTIA MOMENT OF A FLYWHEEL

[75] Inventor: Katsumi Kouno, Susono, Japan

[73] Assignee: Toyota Jidosha Kabushiki Kaisha, Toyota, Japan

[21] Appl. No.: 783,644

[22] Filed: Oct. 3, 1985

[30] Foreign Application Priority Data

Nov. 8, 1984 [JP] Japan ............................ 59-234085

[51] Int. Cl.⁴ .......................................... F16F 16/10
[52] U.S. Cl. ...................................... 74/574; 74/572
[58] Field of Search ............... 74/705, 674, 572, 574

[56] References Cited

U.S. PATENT DOCUMENTS

| | | | |
|---|---|---|---|
| 1,588,795 | 6/1926 | Malecki | 74/572 |
| 1,881,234 | 10/1932 | Ljungstrom | 74/572 |
| 2,118,590 | 5/1938 | Chilton | 74/572 |
| 2,525,946 | 10/1950 | Roberts | 74/572 X |
| 2,981,126 | 4/1961 | Kelly | 74/705 |
| 3,023,636 | 3/1962 | Kelly et al. | 74/572 X |
| 3,391,584 | 7/1968 | Glamann | 74/674 |
| 4,254,668 | 3/1981 | Kessinger et al. | 74/572 |

FOREIGN PATENT DOCUMENTS

| | | | |
|---|---|---|---|
| 448045 | 4/1948 | Canada | 74/674 |
| 55117167 | 10/1978 | Japan. | |
| 150648 | 11/1981 | Japan | 74/674 |

*Primary Examiner*—Allan D. Herrmann
*Assistant Examiner*—Joseph M. Rolnicki
*Attorney, Agent, or Firm*—Cushman, Darby & Cushman

[57] ABSTRACT

A device for varying an equivalent inertia moment of a flywheel comprises a flywheel, a manual transmission including an input shaft and an output shaft, a ring gear coupled to the flywheel, a sun gear coupled to the output shaft and a pinion engaging with the ring gear and the sun gear. A planetary gear mechanism consisting of the ring gear, the sun gear and the pinion increases the equivalent inertia moment of the flywheel during idling, at low speeds and decreases same during normal running, thereby suppressing vibration and noise during idling and improving response during normal running.

7 Claims, 3 Drawing Figures

DEVICE FOR VARYING AN EQUIVALENT INERTIA MOMENT OF A FLYWHEEL

BACKGROUND OF THE INVENTION

1. Field of the Invention

The present invention relates to a device for varying an equivalent inertia moment of an engine flywheel of a vehicle with a manual transmission, thereby reducing variations in engine speed during idling and improving response characteristics during normal running.

2. Description of the Related Arts

The flywheel of an engine suppresses speed variations due to its particularly large inertia moment as compared with other rotatable parts of the engine. When the inertia moment of the flywheel is set large, vibrations due to speed variations can be reduced at low engine speeds. The flywheel, with its large inertia moment, serves to decrease transmission gear chattering due to speed variations during idling when the transmission is in neutral and the clutch is engaged. Further, when the inertia effect is large, the idling speed can be set low to improve.

However, when a car is running at normal speeds, the inertia moment of the flywheel is not needed to be set as large as during idling due to the inertia of the vehicle itself and the moment inertia of its drive system. As a result, the flywheel carries an extra mass during normal running. In high performance applications, a large inertia moment of the flywheel is actually harmful, because it deteriorates engine response.

In the prior art, it has been impossible to satisfy at the same time the contradictory requirements for low speed stability and for quick engine response. It has been a common practice to set the inertia moment of the flywheel and idling speed at such appropriate values that chattering of the transmission and deterioration of fuel economy due to speed variations can be held within tolerable limits. It has been impossible to vary an equivalent inertia moment of the flywheel.

Japanese Patent Publication SHO No. 53-117167 discloses a flywheel comprising a flywheel main body fixed to a rotating shaft, a weighting means freely displasable in a radial direction of the flywheel main body, an auxiliary rotating means rotatably and loosely fit around the rotating shaft and a spring fixed to the flywheel main body and pressing the weighting means elastically against the auxiliary rotating means. In such a flywheel, through balance between a centrifugal force acting on the weighting means and an urging force by the spring, a large inertia moment of the flywheel can be assured at high speeds and a small inertia moment of the flywheel can be assured at low speeds. However, due to such a device for varying an inertia moment of a flywheel, a large adjustment of an inertia moment of a flywheel can not be expected, because a mass of the weight means is small as compared with a mass of the flywheel main body.

SUMMARY OF THE INVENTION

An object of the present invention is to make an equivalent inertia moment of a flywheel variable in accordance with a shift position of a transmission and running speed without any special operation, thereby satisfying at the same time the contradictory requirements for stable engine speed and a quick engine response. More specifically, the present invention aims at attainment of the following objects:

It is an object of the present invention to increase an inertia moment of a flywheel and to decrease engine speed variations during idling, thereby suppressing chattering of transmission gears and further improving fuel economy by allowing the idling speed to be lowered.

It is another object of the present invention to increase an equivalent inertia moment of a flywheel to a comparatively large value at low speeds, thereby decreasing variations in torque transmitted to a drive system and suppressing tortional vibrations in the drive system.

It is an other object of the present invention to decrease the equivalent inertia moment at normal speeds, thereby improving engine acceleration and enabling high performance operation.

A device for varying an equivalent inertia moment of a flywheel according to the present invention comprises a flywheel, a manual transmission selectively coupled to the flywheel and having an input shaft and an output shaft, a ring gear connected to the flywheel, a sun gear connected to the output shaft of the transmission, a planet carrier coupled to a crankshaft, and a pinion rotatably supported by the planet carrier. The pinion engages with the ring gear and the sun gear.

The device for varying the equivalent inertia moment of the flywheel may be constructed so that the ring gear, the sun gear and the pinion are located closer to the crankshaft than the flywheel. The output shaft of the transmission may extend to the sun gear on the crankshaft side. The input shaft of the transmission may be constructed of a hollow shaft and the output shaft of the transmission may extend through the input shaft and the flywheel. The crankshaft, the flywheel, the ring gear, the sun gear, the input shaft and the output shaft of the transmission may have a common axis. The input shaft of the transmission may be supported via a first bearing by the flywheel and the output shaft of the transmission may be supported via a second bearing by the flywheel.

A space housing the ring gear, the sun gear, the pinion, the first bearing and the second bearing may be sealed at one end with a first oil seal and is sealed at the other end with a second oil seal. The space is filled with an oil. The space communicates, via a clearance between the input shaft and the output shaft, to an oil-filled space within the transmission.

In the above-mentioned device for varying an equivalent inertia moment of a flywheel, on account of a planetary gear mechanism consisting of the sun gear, the pinion and the ring gear, the equivalent inertia moment of the flywheel becomes larger as the gear shift position of the transmission becomes lower. In the case of an ordinary manual transmission in which a reduction gear ratio of the 1st shift position to the 4th shift position is 3.587, the equivalent inertia moment of the flywheel at the 1st shift position can be as large as twice the value at the 4th shift position. The result is a large inertia moment of the flywheel at low speeds and a small inertia moment of the flywheel at high speeds, and vibration and chattering during idling and at low speeds can be decreased without deteriorating engine response at high speeds. If the equivalent inertia moment of the flywheel at the 1st shift position is set equal to an inertia moment of a conventional flywheel, the real inertia moment of the flywheel of the present invention becomes smaller than that of the conventional flywheel and therefore the weight of the flywheel can be reduced.

BRIEF DESCRIPTION OF THE DRAWINGS

The above and other objects, features and advantages of the present invention will become apparent and more readily appreciated from the following detailed description of a present preferred exemplary embodiment of the invention taken in conjunction with the accompanying drawings, in which.

DETAILED DESCRIPTION OF THE PREFERRED EMBODIMENTS

Figure 1:
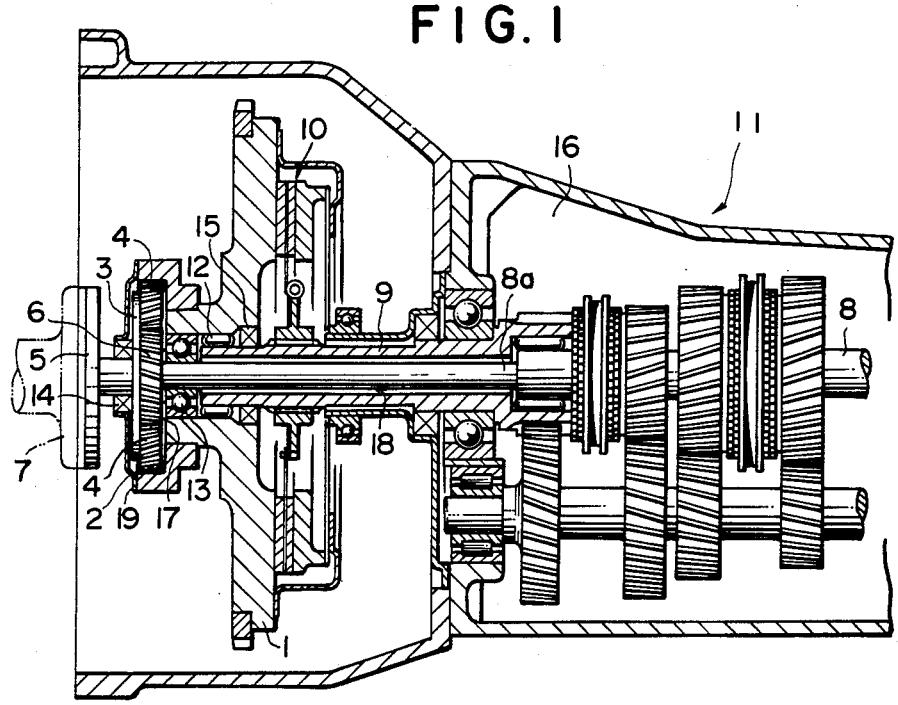
FIG. 1 is an entire sectional view of a device for varying an equivalent inertia moment of a flywheel according to one embodiment of the present invention.

Preferred embodiments of the present invention will be described hereinafter referring to the drawings.

Figure 2:
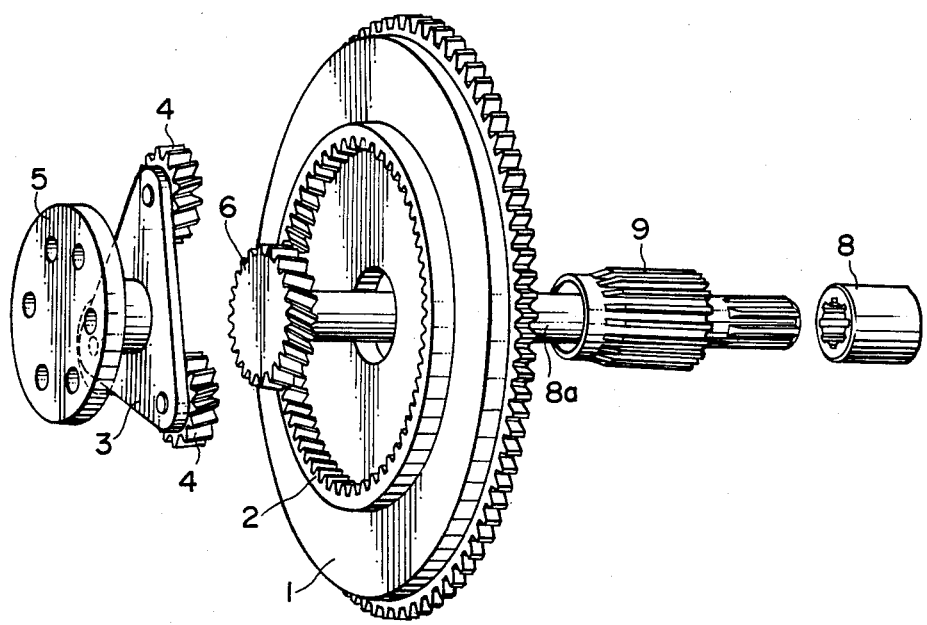
FIG. 2 is an oblique view of a planetary gear mechanism in the device of FIG. 1.

FIGS. 1 and 2 illustrate a preferred embodiment of the present invention.

A flywheel 1 is operatively coupled to a crankshaft 7. Rotation of flywheel 1 is transmitted via a clutch 10 to a manual transmission 11. Flywheel 1 has a ring gear 2 fastened thereto on the crankshaft side. Rotation of crankshaft 7 is transmitted to ring gear 2 and flywheel 1 via a flange 5 fastened to crankshaft 7, a planet carrier 3 and pinions 4 (described in detail below).

An input shaft 9 of transmission 11 is constructed of a hollow pipe. Input shaft 9 is connected to clutch 10 and the front end of input shaft 9 is supported via a first bearing 12 by flywheel 1. An output shaft 8 of transmission 11 includes a shaft portion 8a smaller in diameter than a bore of input shaft 9. Shaft portion 8a is one portion of output shaft 8. Shaft portion 8a extends through input shaft 9 and flywheel 1 toward crankshaft 7. The front end of shaft portion 8a is supported by flywheel 1 by a second bearing 13.

Ring gear 2 is fixed to flywheel 1 at a crankshaft side of flywheel 1. Inside of ring gear 2 is installed a sun gear 6 which is fixed to shaft portion 8a of output shaft 8 of transmission 11. Flange 5 is coupled to a planet carrier 3 which rotatably carries a plurality of pinions 4. Pinions 4 engage with ring gear 2 on their outside and engage with sun gear 6 on their inside. Ring gear 2, pinions 4 and sun gear 6 constitute a planetary gear mechanism. Crankshaft 7, flywheel 1, ring gear 2, sun gear 6, input shaft 9 of transmission 11 and output shaft 8 including shaft portion 8a of transmission 11 have a common axis and they are axially aligned.

A space 17 housing first bearing 12, second bearing 13, a gear portion of ring gear 2, sun gear 6 and pinions 4 is defined, partially, by cover 19 fixed to ring gear 2 and is sealed by a first oil seal 14 at a position of cover 19 and sealed by a second oil seal 15 at a position of flywheel 1. Space 17 is filled with an oil. Space 17 communicates with an oil-filled space 16 within a housing for transmission 11 through a clearance 18 between input shaft 9 and shaft portion 8a of output shaft 8 so that an oil can be supplied to space 17.

Next, the operation of the device thus constructed will be described.

When the number of teeth of ring gear 2 is Zr, the number of teeth of sun gear 6 is Zs, the rotational speed of ring gear 2 is Nr, the rotational speed of sun gear 6 is Ns, and the rotational speed of planet carrier 3 is Nc, the relationship represented by the following equation will stand among them:

$$Nr + (Zs/Zr)Ns - (1 + (Zs/Zr))Nc = 0 \quad (1)$$

When clutch 10 is engaged, the speed of input shaft 9 is equal to Nr, that is, the speed of ring gear 2. Since the speed of output shaft 8 is always equal to Ns, that is, the speed of sun gear 6, the following relationship stands, when transmission 11 is at a shift position of a reduction ratio Ri:

$$Ns = Nr/Ri \quad (2)$$

Putting equation (2) into (1) and substituting R for Zs/Zr, the following equation results:

$$Nr/Nc = (1+R)/(1+(R/Ri)) \quad (3)$$

Since the speed of flywheel 1 is Nr and engine rotational speed is Nc, the above equation (3) shows a relationship between an increased speed ratio of flywheel 1 and the engine rotation.

When flywheel 1 rotates at an increased speed ratio of Nr/Nc, an equivalent inertia moment of flywheel 1 as viewed from the engine becomes $(Nr/Nc)^2$ times the inertia moment of flywheel 1 itself. When denoting the real inertia moment of flywheel 1 by I and denoting the equivalent inertia moment of the flywheel by I', the following relationship will stand between I and I':

$$I' = ((1+R)/(1+(R/Ri)))^2 \cdot I \quad (4)$$

Equation (4) indicates that when the shift position of transmission 11 comes closer to a gear ratio for low speeds, that is, Ri becomes larger, the equivalent inertia moment will become larger.

Next, by putting various values into the gear ratio Ri in equation (4), equivalent inertia moment I' can be calculated and estimated. It should be noted that Ri denotes a gear ratio for transmission 11 and the true gear ratio is Nc/Ns. From equations (1) and (2), the value of Nc/Ns can be obtained as following:

$$Nc/Ns = (Ri+R)/(1+R) \quad (5)$$

When R = Zr/Zs = 0.6 and Ri is set arbitrarily, equivalent inertia moment I' are calculated as shown in Table 1.

TABLE 1

| Shift position | Ri | True reduction gear ratio Nc/Ns | Equivalent inertia moment of flywheel |
|---|---|---|---|
| 1st | 5.139 | 3.587 | 2.053 I |
| 2nd | 2.635 | 2.022 | 1.698 I |
| 3rd | 1.614 | 1.384 | 1.360 I |
| 4th | 1.000 | 1.000 | 1.000 I |
| 5th | 0.778 | 0.861 | 0.816 I |
| Reverse | −6.174 | −3.484 | 3.141 I |

As apparent from the above Table, when transmission 11 is shifted to a low gear, flywheel 1 has a large equivalent inertia moment. For example, equivalent inertia moment I' is increased to 2.053 times true inertia moment I at the 1st position. This means that the same effect as obtained from a conventional flywheel can be expected at the 1st shift position even from a flywheel having an inertia moment which is 1/2.053 times the inertia moment of the conventional flywheel, thus contributing to weight reduction of a flywheel. In this example, when the shift position is changed to a position of higher speed, equivalent inertia moment I' of flywheel 1 becomes smaller than that of the conventional flywheel. However, when a vehicle is running with its clutch engaged and the faster is the speed, the less will be the influence of the variation in engine revolutions. As a result, no trouble will be caused by such a small equivalent inertia moment.

When clutch 10 is disengaged or when the shift of transmission 11 at a neutral position, equivalent inertia moment I' of flywheel 1 will continuously vary according to engine rotational speeds or to vehicle speeds.

Putting $Z_s/Z_r = R$ into equation (1) and transforming equation (1), the increased speed ratio of flywheel 1 can be expressed as follows:

$$N_r/N_c = 1 + R(1 - (N_s/N_c)) \quad (6)$$

Therefore, equivalent inertia moment I' can be expressed as follows:

$$I' = (1 + R(1 - (N_s/N_c)))^2 I \quad (7)$$

$N_s$ is the rotational speed of sun gear 6. Since sun gear 6 is directly connected to output shaft 8 and output shaft 8 rotates the vehicle wheels, $N_s$ is a quantity directly proportional to car speed. $N_c$, which denotes the rotational speed of planet carrier 3, is also the engine rotational speed.

When the vehicle stops, $N_s$ becomes equal to zero. Accordingly, from equation (7) equivalent inertia moment I' becomes $(1+R)^2 I$. At $R=0.6$, I' becomes as large as 2.56I. Therefore, during idling, variations in engine speed is suppressed. As a result, chattering of transmission gears can be suppressed when the shift position of transmission 11 is at the neutral position and clutch 10 is engaged. Such an effect means that engine speed during idling can be lowered, which will lead to an improvement in fuel economy.

In order to examine the influence of vehicle speed, the gear ratio of a differential device, that is, a final gear ratio Gf and a tire radius r are should be determined. When $Gf=3.727$ and $r=0.3$ meters, a relationship between car speed V km/h and number $N_s$ rpm of revolutions of sun gear 6 can be expressed as follows:

$$V = (60N_s/Gf) \times (2 \times 3.14 \times r/1000) = (1/32.954)N_s \quad (8)$$

Figure 3:
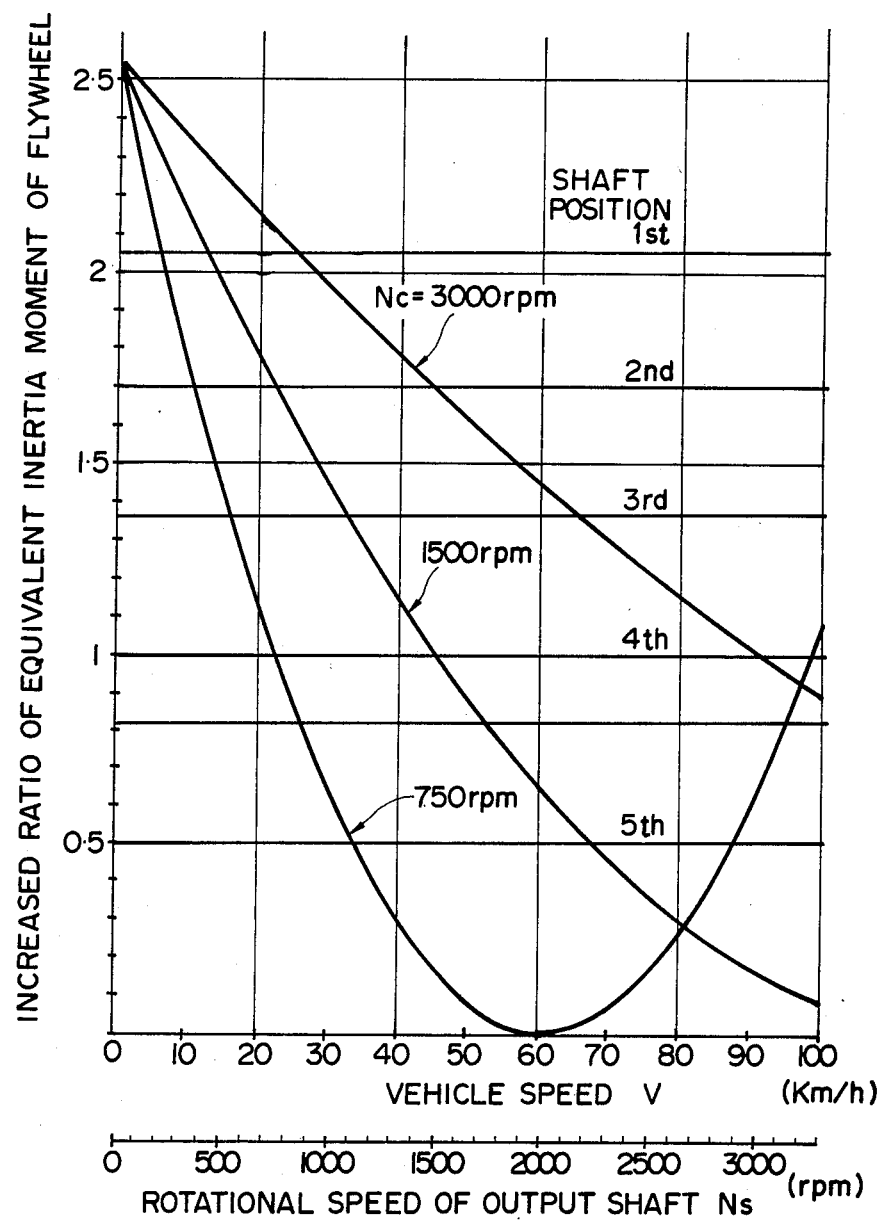
FIG. 3 is a diagram illustrating a relationship between a car speed or a rotational speed of an output shaft and a magnification of increase of the equivalent inertia moment of the flywheel in the device of FIG. 1.

From equations (7) and (8) can be derived a relationship shown in FIG. 3 which shows the relationship among vehicle speed V, engine speed Nc and equivalent inertia moment I' of flywheel 1. It is seen that if engine speed Nc is fixed, equivalent inertia moment I' becomes smaller as vehicle speed V is higher. However, when vehicle speed exceeds a certain limit, equivalent inertia moment will become large. For example, at $N_c=750$ rpm, equivalent inertia moment I' will become large when V exceeds 60.7 km/h. However, such a case will seldom take place during normal running. The horizontally extending lines in FIG. 3 indicate equivalent inertia moment I' at each shift position when clutch 10 is engaged and equivalent inertia moment I' is not a function of car speed V. However, equivalent inertia moment I' is smaller when the shift position becomes higher.

Thus in normal running, equivalent inertia moment I' of flywheel 1 is smaller at a higher speed while I' is larger at a lower speed, either when clutch 10 is engaged and transmission 11 is engaged or when the vehicle is in an inertia running condition at time of shifting of transmission 11. Therefore, a necessary equivalent inertia moment I' is secured at time of idling and at time of low speed, while when a vehicle speed rises to an certain extent, equivalent inertia moment I' can be reduced and engine response characteristics can be improved.

With this design, it is possible to suppress vibration and noise to a low level during idling, while maintaining response characteristics as good as that of a conventional vehicle. It is also possible to improve response characteristics during normal speed running, while maintaining vibration and noise level during idling as good as that of a conventional vehicle.

Further, since the true inertia moment I of flywheel 1 can be made small, it is possible to reduce the weight of the vehicle.

Furthermore, due to the present invention, since the engine is in a speed reduction relationship as viewed from flywheel 1 at time of engine start, the necessary torque for a starter becomes small. Therefore, such secondary effects as making the starter small and lighter can be derived.

Although only a preferred embodiment of the present invention has been described in detail, it will be appreciated by those skilled in the art that various modifications and alterations can be made to the particular embodiment shown without materially departing from the novel teachings and advantages of the invention. Accordingly, it is to be understood that all such modifications and alterations are included within the scope of the invention as defined by the following claims.

What I claim is:

1. A device for varying an equivalent inertia moment of a flywheel disposed between an engine and a transmission, comprising:
    a flywheel mounted for varying rotational speed with respect to the rotational speed of a crankshaft of the engine;
    a manual transmission selectively coupled to said flywheel and including an input shaft and an output shaft;
    a ring gear coupled to said flywheel so as to rotate at the same rotational speed as the rotational speed of the flywheel;
    a sun gear coupled to said output shaft of said transmission so as to rotate at the same rotational speed as the rotational speed of the output shaft of the transmission;
    a planet carrier coupled to a crankshaft so as to rotate at the same rotational speed as the rotational speed of the crankshaft; and
    a pinion rotatably carried by the planet carrier, said pinion engaging with said ring gear and said sun gear.

2. The device for varying an equivalent inertia moment of a flywheel as claimed in claim 1, wherein said ring gear, said sun gear and said pinion are located closer to said crankshaft than said flywheel.

3. The device for varying an equivalent inertia moment of a flywheel as claimed in claim 1, wherein a portion of said output shaft of said transmission extends up to a position of said sun gear toward said crankshaft.

4. The device for varying an equivalent inertia moment of a flywheel as claimed in claim 1, wherein said input shaft of said transmission is constructed of a hollow shaft and a portion of said output shaft of said transmission extends through said input shaft and said flywheel.

5. The device for varying an equivalent inertia moment of a flywheel as claimed in claim 1, wherein said crankshaft, said flywheel, said ring gear, said sun gear, said input shaft of said transmission and said output shaft of said transmission have a common axis.

6. The device for varying an equivalent inertia moment of a flywheel as claimed in claim 1, further comprising a first bearing between said flywheel and said input shaft of said transmission and a second bearing between said flywheel and said output shaft of said transmission so that said flywheel supports said input and output shafts.

7. The device for varying an equivalent inertia moment of a flywheel as claimed in claim 6, further comprising first and second oil seals defining opposite ends of a space housing said ring gear, said sun gear, said pinion, said first bearing and said second bearing and oil filling said space, said space communicating with an oil-filled space within said transmission through a clearance between said input shaft and said output shaft.

* * * * *